United States Patent [19]

Phillips et al.

[11] Patent Number: 4,539,468
[45] Date of Patent: Sep. 3, 1985

[54] WATER BOILING VESSEL IMMERSION HEATER WITH PRIMARY AND SECONDARY THERMAL CUT-OUT PROTECTION

[75] Inventors: Richard A. Phillips; Keith Fletcher, both of Buxton; Peter W. Naylor, Tideswell, all of England

[73] Assignee: Otter Controls Limited, Buxton, England

[21] Appl. No.: 475,825

[22] Filed: Mar. 16, 1983

[30] Foreign Application Priority Data

Mar. 18, 1982 [GB] United Kingdom ............... 8207908
Sep. 27, 1982 [GB] United Kingdom ............... 8227498
Feb. 4, 1983 [GB] United Kingdom ............... 8303075

[51] Int. Cl.³ .................. H05B 1/02; H05B 3/82; H01H 37/54; A47J 27/62
[52] U.S. Cl. .................. 219/330; 219/328; 219/335; 219/337; 219/437; 219/512; 337/348; 337/371
[58] Field of Search ........ 219/328, 330, 331, 436–438, 219/441, 442, 510, 512, 508, 494, 335–337; 337/371, 348, 336, 338, 370

[56] References Cited

U.S. PATENT DOCUMENTS

| | | | |
|---|---|---|---|
| 2,806,123 | 9/1957 | Steinbock | 219/441 X |
| 3,475,590 | 10/1969 | Pins | 219/330 X |
| 3,852,698 | 12/1974 | Schmitt et al. | 337/348 X |
| 3,885,222 | 5/1975 | Manecke | 337/348 X |
| 3,943,480 | 3/1976 | Schmitt | 337/371 |
| 4,288,686 | 9/1981 | Cretors | 219/512 |

FOREIGN PATENT DOCUMENTS

| | | | |
|---|---|---|---|
| 806755 | 12/1958 | United Kingdom | 219/328 |
| 1170763 | 11/1969 | United Kingdom | 219/328 |
| 1430229 | 3/1976 | United Kingdom | 219/437 |
| 2022972 | 12/1979 | United Kingdom | 219/330 |

Primary Examiner—A. Bartis
Attorney, Agent, or Firm—Pollock, Vande Sande & Priddy

[57] ABSTRACT

An electric immersion heating element dry switch-on or boil dry protector unit for an electrically heated water boiling vessel comprises primary and secondary bimetals (31,32) responsive to the heating element head temperature and each arranged for actuating a respective one of primary and secondary switching contacts (11,12) connected in the line and neutral sides of the heating element supply via respective push rods (38,44). The secondary bimetal (32) is arranged to break later than the primary bimetal (31) in a dry switch-on or boil dry situation giving rise to excessive element temperatures, and to reset before the primary in a reducing temperature situation. The secondary bimetal (32) and associated switch contacts (12) provide back-up protection in the event of failure of the primary protection on account for example of welding of the primary switch contacts (11). A neon warning lamp connected across the secondary contacts (12) will be lit only if the secondary contacts open with the primary contacts closed and thus indicates failure of the primary protection. An advantageous manually releasable latching arrangement for the primary and/or secondary switching contacts is also provided. An additional bimetal subject to heating by steam vented from the vessel operates at least one of the switch contacts when water boils in the vessel to terminate the heating operation.

33 Claims, 5 Drawing Figures

FIG.1

WATER BOILING VESSEL IMMERSION HEATER WITH PRIMARY AND SECONDARY THERMAL CUT-OUT PROTECTION

This invention concerns improvements in or relating to immersed element protection, i.e., protective devices associated with the electrically-powered heating elements of water heating vessels such as electric kettles, jugs, urns, etc., for interrupting the power supply to the element in the event of an over-temperature condition such as might occur, for example, if the vessel were to be switched on without there being any water in it (a so-called "dry switch-on" situation) or if the vessel were to boil dry (a so-called dry boil situation).

Element protection devices designed to guard against such a dry switch-on or dry boil situation are known in the art. For example, one such device of applicant's manufacture is the Otter Controls Z30 element protector which is illustrated and described in British Patent Specification No. 2 045 588A and comprises a snap-acting bimetallic switch-actuating element arranged to be mounted in close thermal contact with the element head so as to be subject to the temperature of the element, and serving for the actuation of a pair of switching contacts in the live line to one of the element cold tails.

Whilst such devices as our Z30 element protector have been proven to be consistent and reliable in operation, there is notwithstanding a requirement which is particularly though not exclusively relevant to the situation of water boiling vessels formed of synthetic plastic materials for a back-up system operative in the event (however unlikely) of the primary protector failing to operate.

We have investigated the possibility of providing such back-up protection by fitting a fusible "one shot" device into the primary element protector. However, since the element head temperature of an electric heating element commonly continues to rise in a dry switch-on situation even after the element protection switch has tripped so as to cut off the power supply to the element, we have found such an arrangement to be unworkable on account of the necessity to set the "one shot" operating temperature at such a high level to avoid spurious nuisance tripping under a normal dry switch-on condition that the "one shot" will not render meaningful secondary protection when called upon to do so by failure of the primary protection.

The present invention resides in the concept of an element protector incorporating two independent thermal sensors (such as snap-acting bimetallic elements, for example) each controlling a separate pair of switching contacts and each in intimate thermal contact with the element head. The primary protection in such an arrangement will conveniently be a manually or automatically resettable switch in the live connection to the element, with the secondary or back-up switch being either manually or automatically resettable and conveniently in the neutral element connection. The secondary switch advantageously will be arranged so that, while it will operate each time there is a dry switch-on or boil-dry situation, it will be required to break current only in the unlikely event of failure of the primary control, this being achieved by arranging the secondary protection to be operable to break the secondary switching contacts after the primary contacts have been broken and to remake, before the primary contacts remake either by use of thermal sensors with appropriately slightly different characteristics for the primary and secondary protection or by locating the primary and secondary thermal sensors in different degrees of thermal contact with the element head, or by a combination of these two possibilities.

By virtue of the independence of the primary and secondary cut-outs, the advantage is obtained that welding of the primary contacts, potentially the most hazardous failure condition of the primary protector, will not effect the functionability of the back-up protector.

A neon lamp or other sensible indicating device can advantageously be associated with the unit to indicate malfunction of the primary protector due to its contacts failing to open. If a neon lamp were connected across the secondary contacts, the only time it would illuminate would be when the secondary contacts opened while the primary contacts were still closed, a condition which would not occur if the control where operating properly. By this means an indication of failure of the primary protection can readily be provided.

For arranging the primary and/or secondary protection switches to be manually resettable, i.e., for arranging that they do not cycle automatically between contacts-closed and contacts-open conditions as their environmental temperature cycles between low and high levels, a latching means may conveniently be associated with the thermal sensors (bimetallic elements) or their associated switches for latching the same in their high temperature condition against return to their low temperature condition when the temperature falls. An especially convenient manually-releasable latching arrangement makes use of a latching member comprising a molded plastic or composite plastics and metal L-shaped or bellcrank lever having integrally formed therewith a part which couples with the extremity of one limb of the L-shaped lever by means of a resilient hinge portion. The extremity of the other limb of the L-shaped lever constitutes a latching abutment for engagement with a member of the switch unit in question. The latching member is arranged so that when the switch unit operates the latching abutment engages with the respective member of the switch unit so as to preclude its return and thereby latch out the switch. Resetting is achieved by depression of the part of the latching member which is coupled with one limb of the L-shaped lever by means of the resilient hinge, this causing the L-shaped lever to pivot generally about the junction of its two limbs, such that the latching abutment constituted by the extremity of one of the said limbs moves out of its latching position and permits the switch unit to reset.

In further accordance with the present invention, a latching member of the general type aforementioned might be associated with each of the primary and secondary element protection switch units, either in the form of a separate latching member for each element protection switch or in a combined form wherein, in effect, two such latching members are combined in back-to-back manner into a single integral unit.

The invention, together with features and advantages thereof, will best be understood from consideration of the following description of exemplary embodiments which are illustrated in the accompanying drawings, wherein.

Figure 1:
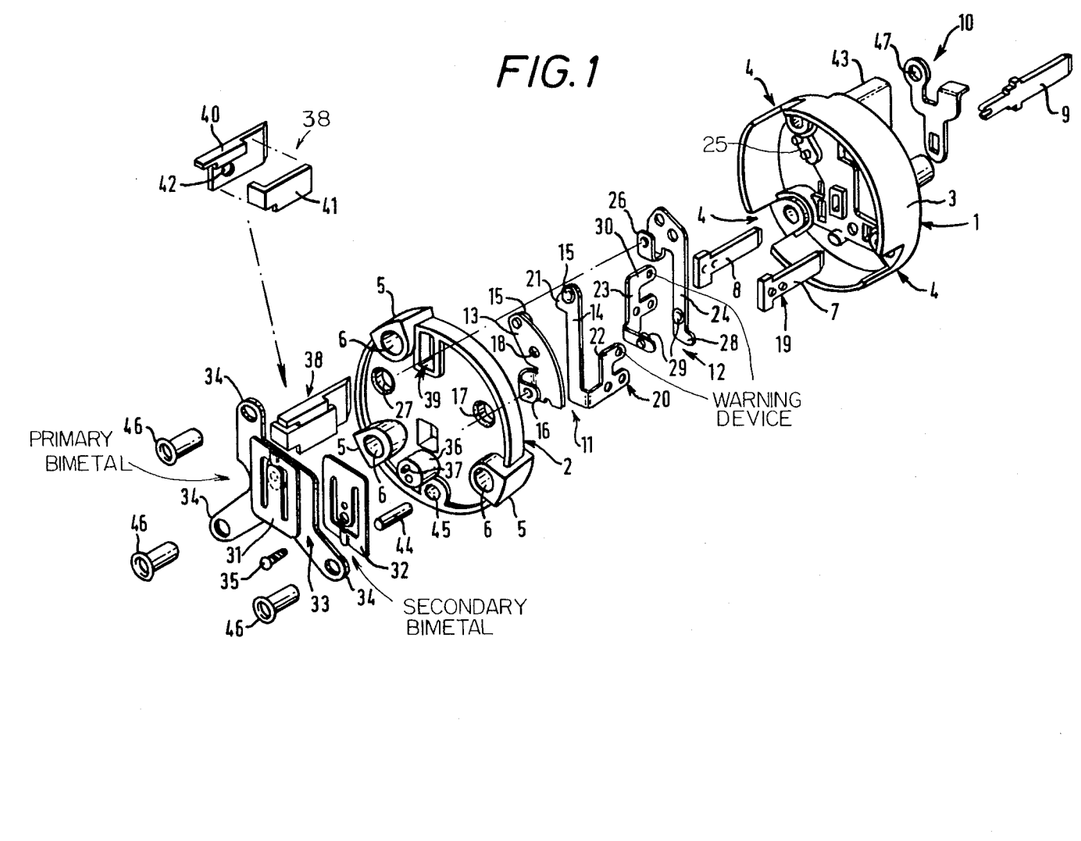
FIG. 1 is an exploded perspective view of a first embodiment of a dry switch-on or dry boil element protector unit according to the present invention.

Referring first to FIG. 1, the embodiment of the invention shown therein is an element protection unit designed to switch off the power supply to an electrically powered heating element, such as an electric kettle element for example in the event of the element temperature rising to an unsafe level on account of the element being switched on with the associated vessel empty (a so called "dry switch-on" situation) or of the associated vessel boiling dry (a so-called "dry boil" situation). Such element protection units are, in general terms, well known and in accordance with the present invention the embodiment shown in FIG. 1 has primary and secondary element protection.

More particularly with reference to FIG. 1, the embodiment comprises first and second molded plastic parts 1 and 2 adapted to be riveted together as will hereinafter be described, the part 1 being generally cup-shaped with a peripheral wall upstanding from a base and the part 2 being adapted to assemble with the cup-shaped part as a closure for the concavity therein, such concavity serving, as will be described, for the mounting of fixed and movable contact sets of the unit. The peripheral wall 3 of the part 1 is formed with rectangular cut-outs 4 adapted to register with complimentarily shaped formations 5 provided on the part 2 for locating the two parts 1 and 2 properly relative one to the other. The formations 5 in the part 2 have riveting through-holes 6 and are relatively substantially formed to accept the stresses of rivetting, and corresponding strengthening and through-holes for rivetting are provided in the part 1.

Apertures are formed in the base of the part 1 for receiving live, neutral and earth pins designated 7, 8 and 9 respectively. The live and neutral pins have enlarged head portions designed to be captured between the two plastic molding parts 1 and 2 for securing the pins in the unit, and the earth pin has a split end portion adapted to be passed through an aperture formed in a connecting link 10, the purpose of which will be explained hereinafter, through the respective earth pin receiving aperture in the base of the molding part 1, and to be peened apart on the concave side of the part 1 for securing the earth pin to the molding.

Within the concavity of the molding part 1 are adapted to be fitted primary and secondary switching contact sets 11 and 12. The primary contact set 11 comprises a fixed contact member 13 and a moving contact member 14 both formed, for example, of stamped beryllium-copper spring metal and each provided with a silver contact 15. The primary fixed contact member 13 has a turned over spring portion 16 for electrically contacting one of the silver-tipped cold tails of the heating element, such cold tail extending through the opening 17 formed in the molding part 2, and is adapted to be fixed to the base of molding part 1 by virtue of a stud (which cannot be seen in FIG. 1) which is provided upstanding from the base of molding part 1 engaging through the opening 18 in contact member 13 and being thermoplastically deformed to capture and secure contact member 13. The primary moving contact member 14 is adapted to be secured to the head of the line pin 7 which has a pair of projections 19 to be engaged in apertures 20 of the contact member 14 and coined to secure the member 14 to the line pin. The primary moving contact member 14 further has an abutment portion 21 serving, as will hereinafter be explained, as an operating point for a switch-operating push rod, and has a limb 22 providing a connection point for a neon lamp or the like. In similar fashion, the secondary contact set 12 comprises a fixed contact member 23 adapted to be secured to the head of the neutral pin 8 and a movable contact member 24 adapted to be affixed at its upper end to a platform 25 integrally molding with the molding part 1, and having a portion 26 for electrically contacting the other cold tail of the element which projects through aperture 27 in the molding part 2. The secondary moving contact member 24 also is arranged to be operated by means of a push rod to be described hereinafter, the said push rod acting on the lower end of the member 24 at the point designated 28. Silver contacts 29 are provided on the fixed and moving secondary contact members 23 and 24 and an ear 30 is provided on the fixed contact member 23 for connection of a neon lamp or the like.

The element protection unit of FIG. 1 is further provided with primary and secondary bimetallic switch-actuating elements 31 and 32 for operating the primary and secondary switching contact sets 11 and 12 respectively. The bimetallic elements 31 and 32 are each of a known snap-acting type comprising a stressed generally rectangular bimetal blade having a tongue released therefrom as described for example in British Patent Specification Nos. 600055, 657434 and 1064643. The primary blade 31 is welded at the free end of its released tongue to an upstand formed on a brass mounting plate 33 having three limbs 34 formed at their outermost ends with riveting holes for the fixing of the plate 33 to the assembly comprising molding parts 1 and 2, and the secondary blade 32 is arranged to be staked by means of pin 35 passed through an aperture formed in the tongue of secondary blade 32 and driven into a receiving bore provided in an upstand 36 formed integrally with the molding part 2. A projection 37 from the surface of upstand 36 locates in a further hole in the tongue of secondary blade 32 for ensuring correct orientation of the blade. As will be appreciated, with the primary and secondary blades 31 and 32 thus mounted by their released tongues, switch actuating movement of the blades derives at the bridge portions of the blades, i.e., at the crimped portion adjacent the free end of the tongue which bridges the two limbs of each blade which extend alongside the released tongue. The underside of the mounting plate 33 may be configured so as to mate closely with the secondary blade 32 in its cold condition for enhancing thermal transfer to blade 32.

For operating the primary contact set 11 by means of the primary blade 31, a primary push rod assembly 38 is provided which extends through an aperture 39 in the moulding part 2 and physically interconnects the bridge portion of primary blade 31 with the push rod operating point 21 on the primary moving contact member 14. The push rod assembly 38 is comprises of two parts, a slide 40 and a rider 41, which engage with each other with a degree of relative movement permitted between them by virtue of a peg (not visible in the drawing) on the rider 41 engaging in an oversized hole 42 in the slide 40. The rider 41 abuts the bridge portion of primary blade 31 and the operating point 21 of primary moving contact member 14 at its respective ends, and the slide is intended to extend past the primary moving contact member 14 and into a channel 43 formed in the molding part 1 for engaging a manually-resettable latching mechanism associated with a steam-sensing automatic switch-off unit which may or may not be associated with the described element protector unit as may be desired. When the described element protector unit is used on its own, the primary and secondary blades 31 and 32 will cycle automatically as the temperature rises and falls, and the switching contact sets 11 and 12 will correspondingly cycle automatically. If the described unit is used in conjunction with a steam sensing unit designed automatically to trip out and latch a manually-resettable control, similarly to the use in conjunction of the Otter Controls Z30 dry boil and Z40 steam sensing units in the arrangement described in British Patent Specification No. 2 045 588, then the said manually-resettable control will engage with the slide 40 for opening of the primary switching contacts 11 not only under the action of dry boil primary blade 31 transmitted by means of rider 41, but also under the action of the steam sensing actuator transmitted through the resettable control and the slide 40. Since the steam-sensing automatic switch-off operation will be performed under normal circumstances much more frequently than the dry boil switch-off operation, the slide and rider arrangement is designed to permit a greater contact separation in response to operation of the steam sensing unit than in response to operation of the described dry boil unit, the aforementioned manually resettable control being arranged upon latching out to pull the slide 40 to the right as viewed in FIG. 1 for increasing the primary contacts opening movement of the rider 41.

The secondary blade 32 is arranged to operate the secondary switching contacts set 12 by virtue of a glass or other electrically insulating push rod 44 which extends through an aperture 45 in molding part 2 and abuts with its respective ends the bridge portion of secondary blade 32 and the operating point 28 of secondary moving contact member 24.

Rivets 46 are shown in FIG. 1 for securing the molding parts 1 and 2 and the primary blade mounting plate 33 together, and it will be seen that the earth pin connecting link 10 also is formed with riveting hole 47 so that the respective rivet 46 engaged with link 10 ensures the earthing of the primary blade mounting 33.

The unit thus described is arranged so that when assembled with, for example, the element head of an electric heating element for a kettle, the primary blade 31 locates in intimate thermal contact with the element head, preferably in the region of the hot return portion of the element proper. The primary blade 31 is thereby arranged to be very quickly responsive to over-heating of the element. The secondary blade 32, on the other hand, is less intimately thermally coupled with the element head by virtue of being to an extent screened therefrom by the thermal mass of the primary blade mounting plate 33. This arrangement, coupled as necessary with the blades 31 and 32 being selected to have different operating characteristics, ensures that in an overheating situation the secondary blade 32 will break later than the primary so that the secondary contact set 12, which as a result can have smaller silver contacts than the primary set, breaks under zero current conditions assuming the primary contact set 11 has already broken. If the primary protection fails, for whatever reason and however unlikely this is to happen, then the secondary protection can still operate. The secondary blade 32 will desirably be arranged to reset after breaking before the primary blade 31 remakes, such arrangement being achieved for example by appropriate selection of the blade make-to-break differentials.

A neon or like indicator lamp, or even an audible warning device, coupled across the secondary contacts will be energized only if the secondary contacts open with the primary contacts closed and thus provides a warning of failure of the primary protection.

The embodiment described hereinbefore is of course susceptible to modification and variation without departure from its basic operating principles. For example, the secondary blade 32 could be mounted on the back of the primary blade mounting 33 rather than on the molding part 2, and alternative means might be utilised for securing the respective blades to their mountings. Furthermore, while the unit as described is latching, i.e., inhibited from recycling as the element temperature cycles, only when used in association with a steam sensing unit having appropriate control means to cooperate with the slide 40 of push rod assembly 38, it could of course incorporate its own latching arrangement, and one such arrangement will hereinafter be described with reference to FIG. 4.

Figures 2, 3:
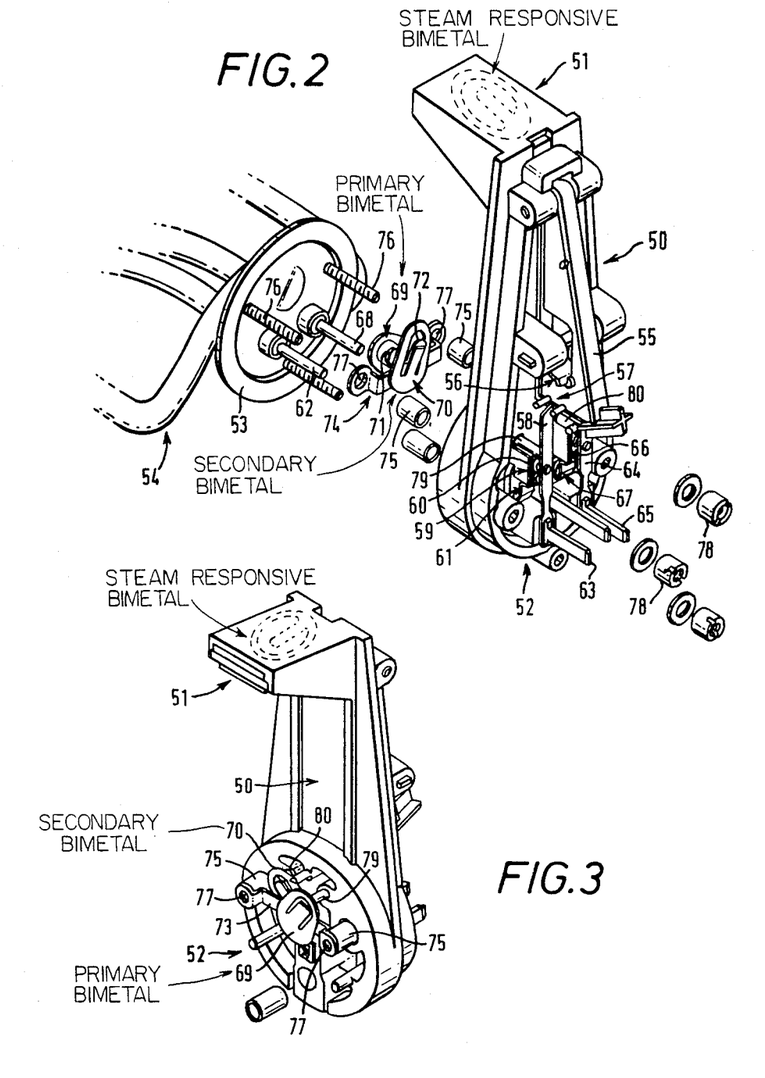
FIG. 2 is a perspective view of a second embodiment of a combined steam-sensing automatic switch-off unit and dry switch-on element protector unit according to the present invention, the embodiment being shown partly in exploded view and a conventional heating element also being shown.
FIG. 3 is a further perspective view of the embodiment of FIG. 2 viewed from a different direction.

FIGS. 2 and 3 show different perspective views of a second embodiment of the present invention which is constructed as a modification of the Otter Controls Z20 automatic kettle control unit as described, for example, in British Patent Specification Nos. 1 470 365, 1 470 366 and 1 470 367 to which reference may be made for a fuller understanding. The embodiment of FIGS. 2 and 3 will be described hereinafter only insofar as is considered necessary for an understanding of the differences according to the present invention between the illustrated embodiment and the Z20 automatic kettle control unit.

The illustrated embodiment comprises a unitary plastic molding 50 having an upper portion 51 adapted in use to locate adjacent a steam vent orifice in an upper wall portion of a kettle body, and a lower portion 52 adapted to locate and assemble with the element head 53 of an electric heating element 54 for the kettle. Within the upper portion 51 of the molding 50, there is housed a snap acting bimetallic switch-actuating member shown in broken lines in either or FIGS. 2 and 3 and can for example be of the same general form as the primary and secondary blades 31 and 32 of the FIG. 1 embodiment. The switch-actuating member in the upper housing portion 51 is arranged so as, when it breaks in response to the impingement of steam venting from the kettle, to act upon one end of a pivoted lever 55 so as to cause the said lever to pivot in a counter-clockwise direction as it is viewed in FIG. 2. The lever 55 has an overcenter type latching spring arrangement 56 associated with it, so that once it moves under the action of the steam sensing bimetal it latches until manually reset by being pivoted clockwise. At its lower end, as viewed, the lever 55 carries a pair of projections 57 which locate one on each side of a moving contact carrying leaf spring 58 of a primary contacts set 59 which also comprises a fixed contact member 60 formed with a spring portion 61 adapted to make electrical contact with a respective heating element cold tail 62. The leaf spring 58 is coupled with the line pin 63 so that when the steam sensing bimetal breaks and pivots lever 55 counter-clockwise, the lower end of the lever lifts leaf spring 58 so as to break the primary contacts and thereby break the connection between line pin 63 and the respective element cold tail 62. This situation then is maintained regardless of the resetting of the steam sensitive bimetallic actuator, on account of the overcentre latching arrangement of the lever 55, until such a time as the lever 55 is manually reset.

The conventional Otter Controls Z20 unit also has associated with the lower portion 52 of the molding 50 a dry boil protection assembly comprised of a snap-acting bimetallic element arranged to be in intimate thermal contact with the element head 53 and coupled by means of a movement transmitting push rod with the aforementioned leaf spring 58. In the event of an element overtemperature condition, the respective bimetallic element breaks, thereby opening the swich contacts in the live circuit by displacement of the moving contact carrying leaf spring 58. The embodiment of the present invention illustrated in FIGS. 2 and 3 also incorporates such a dry boil protection arrangement as a primary protection, and further comprises a secondary dry boil protection generally identical with the primary protection but associated with the circuit between the neutral pin and the other element cold tail and without any interaction between the secondary moving contact carrying element and the lever 55.

Thus, the secondary protection circuit comprises a movable contact carrying leaf spring 64 connected with the neutral pin 65 and a fixed contact carrying member 66 having a spring portion 67 for contacting the other element cold tail 68.

Primary and secondary snap-acting bimetallic switch actuating elements 69 and 70 respectively, each in the form of a generally pear-shaped dished bimetallic blade formed with a U-shaped cut-out defining a tongue released from the blade and movable with a snap action between oppositely dished configurations, are welded each at the free end of its released tongue to respective ones of a pair of support limbs 71 and 72 formed on the bridging portion 73 of a support member 74 formed as a brass stamping and adapted to be secured relative to the lower portion 52 of the molding 50 and with spacing therefrom set by means of spacer tubes 75 when the said lower molding portion 52 is assembled with the element head 53, screw-threaded studs 76 of the element head 53 being arranged to pass through apertures 77 formed in end portions of the support member 74 and through correspondingly located apertures in the lower molding portion 52 to be secured by means of internally screw threaded bushings 78. Each of the primary and secondary bimetallic switch actuating elements 69 and 70 has an associated push rod 79 and 80 respectively received in a respective aperture in the lower molding part 52 and bearing upon the respective primary or secondary moving contact carrying leaf spring 58 or 64.

The operation of the embodiment of FIGS. 2 and 3 will be clearly appreciated without need for further detailed explanations. The two bimetallic blades 69 and 70 provide primary and secondary dry boil protection in similar fashion to the two bimetallic blades 31 and 32 of the embodiment of FIG. 1, and the steam sensing automatic switch-off function is accomplished as in the known Otter Controls Z20 units described in British Patent Specification Nos. 1 470 365, 1 470 366 and 1 470 367 aforementioned.

Figure 4:
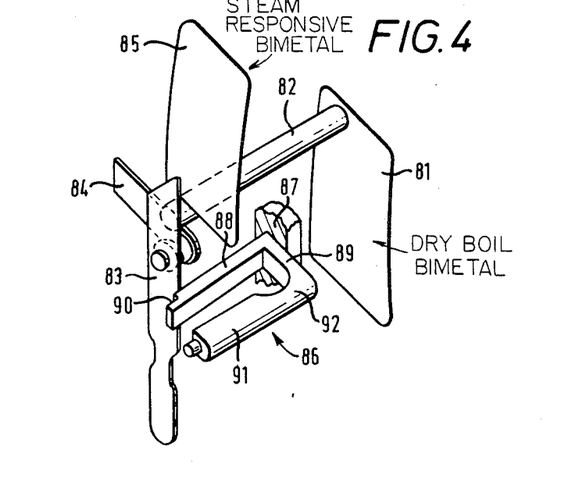
FIG. 4 is a schematic showing of an advantageous form of manually-releasable latching arrangement useful with the present invention.

It was mentioned in connection with the embodiment of FIG. 1 that latching could be effected independently of the provision of a separate steam sensitive unit if desired. Clearly many different ways of effecting this will readily occur to those possessed of appropriate skills, but one particularly simple and effective form of latching arrangement which can be used with the present invention is schematically illustrated in FIG. 4 which shows a dry boil responsive bimetallic blade 81, which may be in the form of the blades 31 and 32 of the FIG. 1 embodiment or in the form of the blades 69 and 70 of the FIGS. 2 and 3 embodiment or may take any other form, coupled by means of a push rod 82 with the moving contact carrying leaf spring 83 of a switch contacts set further comprising a fixed contact carrier 84. A steam sensing bimetallic blade 85 is shown also arranged to act upon the moving contact carrier 83 for the purpose of indicating that the latching arrangement hereinafter described is usable both with dry boil sensing and steam sensing arrangements either separately or in combination. A latching member 86 is shown associated with the moving contact carrier 83.

The latching member 86 generally comprises a molded plastic L-shaped lever having integrally formed therewith a part which couples with the extremity of one limb of the L-shaped lever by means of a resilient hinge portion. For some applications it might be desirable to form the latching member, at least so far as concerns its resilient hinge portion, of a more robust spring metal material. The extremity of the other limb of the L-shaped lever constitutes a latching abutment for engagement with the movable switch part of the switch unit in question. The latching member, in operation, is arranged so that when the switch unit operates the latching abutment engages with the respective member of the switch unit so as to preclude its return and thereby latch out the switch. Resetting is then achieved by depression of the part of the latching member which is coupled with one limb of the L-shaped lever by means of the resilient hinge, this causing the L-shaped lever to pivot generally about the junction of its two limbs such that the latching abutment constituted by the said extremity of one of the limbs moves out of its latching position and permits the switch unit to reset.

More particularly with reference to FIG. 4, the latching member 86 is mounted so as to have a reaction abutment 87 in the region of the junction of the limbs 88 and 89 of its L-shaped part and with the extreme free end of its limb 88 biased against moving contact carrying leaf spring 83 so that, when the leaf spring is moved by either the dry boil or the steam sensing bimetal blade 81 or 85, respectively, the notch 90 engages with the leaf spring 83 so as to prevent its return. The switch contacts are then latched open. For resetting the unit, a longitudinal force applied to the latching member part 91 causes the L-shaped part to pivot anti-clockwise as viewed, with flexing of the hinge portion 92, so releasing the latch and permitting the switch contacts to reclose. The hinge portion 92 of the latching member 86 provides the spring biasing of the latch towards the leaf spring 83 and, it being appreciated that in a practical arrangement as opposed to the schematic arrangement shown the latching member 86 will be constrained by the manner of its mounting as to the extent of lateral movement of its parts 88 and 91, accommodates a degree of distortion of the latching member 86 against a self generated restoring force.

The latching member 86 shown in FIG. 4 might be incorporated into the embodiment of FIG. 1 within a recess formed in one or other of the molding parts 1 and 2, or defined by or between the two parts, and separate such latching members might be associated with the primary and secondary contact sets 11 and 12. For resetting the thus incorporated latching members, the parts 91 thereof might extend through the molding part 1 so as to be accessible for manual operation on the side of the unit wherefrom project the line, neutral and earth pins. A similar arrangement could be employed for incorporating such latching members into the embodiment of FIGS. 2 and 3, though an alternative dual latching arrangement as shown in FIG. 5 might be considered more suitable.

Figure 5:
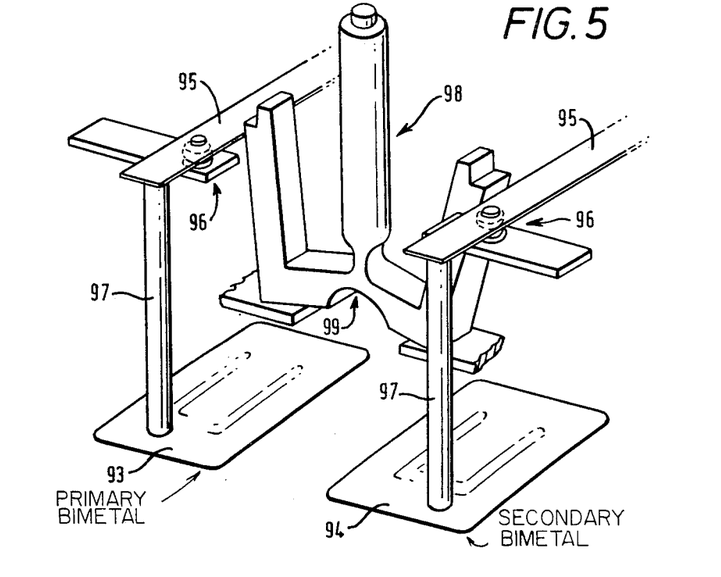
FIG. 5 is a schematic showing of a double latching arrangement operating according to the principles of the FIG. 4 arrangement.

Referring to FIG. 5, schematically illustrated therein is a dry boil element protection arrangement according to the present invention having primary and secondary bimetal blades 93 and 94, respectively, each arranged to operate the moving contact carrying leaf spring 95 of a respective contacts set 96 through a respective push rod 97. A dual function latching member 98 constituting, in effect, a pair of the latching members of FIG. 4 mounted back-to-back, is associated with the moving contact carriers 95; a similar arrangement could indeed have two separate latching members as in FIG. 4 mounted back-to-back. A cut out 99 at the base of latching member 98 enhances its flexibility. The operation of the arrangement of FIG. 5 will be clear; operation of either of the bimetals 93 and 94 to open its associated switch contacts, or even of both of the bimetals, will cause its associated leaf spring to be latched into a contacts open condition until reset by operation of the latching member.

The latching members of FIGS. 4 and 5 can conveniently be formed of an appropriate synthetic plastic material, such as acetal homopolymer or, copolymer, for example, preferably by molding, though for certain applications where it may be required to withstand many thousands of cyclical operations it may be preferable to construct the latching member for example as a plastic metal composite with the resilient hinge portion formed of or reinforced with metal. The described latching members are particularly advantageous in that they generate their own spring functions for latching and restoring movements and are attitude insensitive, i.e., they can operate in any physical orientation.

We claim:

1. In combination with a water boiling vessel, an electrically powered heating element for heating water contained in said vessel up to boiling temperature, and an element protection unit for protecting said heating element against being overheated by virtue of power being supplied to the element when said element is not immersed in water, said heating element comprising a resistance heating portion and an element head portion, said element head portion serving for mounting said element in said vessel, and said element protection unit being mounted adjacent said element head portion so as to be subjected to being heated by heat developed in said head portion when said element is powered, said element protection unit comprising first and second safety cut-out switches coupled electrically in series with one another and with said resistance heating portion of said element between power supply terminals of said element protection unit and respectively providing primary and secondary protection for said element, each of said first and second cut-out switches comprising a bimetallic element maintained in close thermally coupled relationship with said element head portion and providing thermally-responsive contacts-opening and contacts-closing movements via an electrically insulating coupling to a respective one of a first and a second pair of switching contacts each comprising a fixed contact and a movable contact, and manually releasable latching means associated with the movable contact of at least said second cut-out switch for latching the same in its contacts-open condition until reset, the operating temperature of the bimetallic element of said first switch being set to determine a mean maximum operating temperature of said heating element and the operating temperature of the bimetallic element of said second switch being set above that of said first bimetallic element such that said second switch opens in the event that the heating element temperature increases substantially above said maximum operating temperature in consequence of failure of said first switch to operate.

2. The combination according to claim 1, wherein each of said first and second bimetallic elements comprises a dished bimetallic blade formed with a generally U-shaped cut-out defining a released tongue portion of said blade and movable with a snap action between oppositely curved configurations, each of said first and second snap-acting bimetallic blades being mounted by virtue of the free end of said tongue thereof being secured to a respective blade mounting part of said element protection unit.

3. The combination according to claim 2, wherein said element protection unit comprises a body member, said first and second bimetallic blades are both mounted on a carrier member secured to said body member of said element protection unit and are so arranged that the first blade is in direct intimate thermal contact with said element head portion of said element and said second blade is spaced from said element head portion and is subject to heat conducted from said element head by said carrier member.

4. The combination according to claim 2, wherein said element protection unit comprises a body member, said first blade is mounted on a carrier member which is secured to said body member of said element protection unit and is so arranged that said first blade is in direct intimate thermal contact with said element head portion of said element, and said second blade is mounted on said body member so as to be subjected to heat conducted from said element head portion by said carrier member.

5. The combination according to claim 1, wherein the arrangement of said first and second bimetallic elements is such that, in response to heating element overheating, said first bimetal will operate before said second bimetal and in response to subsequent cooling of said element said second bimetal will reset before said first bimetal.

6. The combination according to claim 5, wherein a warning device is coupled across said second switch contacts so as to be energised for delivering a sensible warning only if said second switch contacts open while said first switch contacts are closed, said warning device thereby being arranged to deliver a sensible warning of failure of said first cut-out switch when said second cut-out switch operates.

7. The combination according to claim 1, wherein said element protection unit comprises a first body portion, power supply pins secured to said first body portion for the connection thereto of a mains electrical power supply cable, a second body portion secured to said first body portion so as to define a chamber between said first and second body portions, said first and second pairs of switching contacts being secured within said chamber, and said electrically insulating couplings extending through said second body portion for transmitting the movements of said first and second bimetallic elements to moving contact carriers of said first and second electrical switches.

8. The combination according to claim 7, wherein the electrically insulating coupling extending through said second body portion for transmitting the movements of one of said first and second bimetallic elements to its associated moving contact carrier comprises a push rod extending between the respective bimetallic element and its associated moving contact carrier, and means are provided associated with said push rod and coupled with a further thermal sensor for operation of the respective electrical switch thereby, such further thermal sensor comprising a steam sensitive switch actuating element provided on the vessel for operating the respective electrical switch via said push rod when, in use of said vessel, steam generated when the water boils therein impinges upon said further thermal sensor.

9. The combination according to claim 1, further comprising steam sensing means arranged for operating at least one of said first and second switches in response to the generating of steam when water boils within said vessel.

10. The combination according to claim 9, wherein said steam sensing means comprises a third snap-acting bimetallic element located for the impingement thereon of steam when water boils within said vessel, and coupling means are provided for transmitting the operating movement of said third bimetallic element to at least one of said pairs of switching contacts of said first and second cut-out switches.

11. The combination according to claim 10, wherein said coupling means comprises an overcenter lever arrangement.

12. The combination according to claim 1, wherein said manually-releasable latching means includes a latching member comprising a generally L-shaped lever having a release member coupled to the extremity of one limb thereof by means of a resilient hinge portion, the extremity of the other limb of said L-shaped lever constituting an engaging member for engagement with the movable contact of the respective switch for latching the same in contacts open condition, the arrangement being such that, with said engaging member so latching said switch, manual operation of said release member causes said L-shaped lever to pivot generally about the junction of its two limbs and with resilient flexing of said hinge portion so as to release the latching of said switch.

13. The combination according to claim 12, wherein said latching member is formed of molded plastic material.

14. The combination according to claim 12, wherein latching means are associated with both of said first and second switches and each comprises a said latching member, the two said latching members being combined into a single structure wherein a single said release member couples with respective resilient hinge portions which in turn couple to respective said generally L-shaped levers.

15. In combination with a water boiling vessel, an electric heating element and an element protector and steam sensing unit for switching off the power supply to said heating element in the event of element overheating occasioned by said element being switched on without there being sufficient water in said vessel and also when water boils in said vessel, said heating element comprising a resistance heating portion for heating water in said vessel and an element head portion serving for mounting said heating element in said vessel, and said element protector and steam sensing unit comprising a first part mounted adjacent said element head portion so as to be subject to heat developed at said head portion by virtue of the powering of said element, and a second part arranged to be subject to steam vented from the interior of said vessel when water boils in said vessel, said first part comprising first and second bimetallic elements in close thermally coupled relationship with said element head and first and second pairs of switching contacts coupled with respective ones of said first and second bimetallic elements via respective electrically-insulating movement-transferring couplings for transferring the respective bimetallic element movements into switching movements of the respective switching contact pair, said first and second pairs of switching contacts being connected electrically in series with each other and with the resistance heating portion of the heating element, and said second part comprising a third bimetallic element subject to heating by steam vented from said vessel and movement-transferring means associated with said third bimetallic element for transferring movement therefrom to at least one of said first and second pairs of switching contacts for initiating switching movements thereof, said first bimetallic element being set to an operating temperature such as to determine a mean maximum operating temperature of said heating element and the operating temperature of said second bimetallic element being set above that of said first bimetallic element such that said second pair of switching contacts opens in the event that the heating element temperature increases significantly above said maximum operating temperature in consequence of failure of said first bimetallic element to open said first pair of switching contacts.

16. The combination according to claim 15, wherein said first bimetallic element is mounted in direct intimate thermal contact with said element head portion, and said second bimetallic element thermally couples with said element head portion less intimately than said first bimetallic element.

17. The combination according to claim 15, including manually-releasable latching means associated with at least one of said first and second pairs of switching contacts for latching the same in contacts-open condition until said latching means is manually released.

18. The combination according to claim 17, wherein said latching means is comprised by said movement-transferring means associated with said third bimetallic element and which includes an overcenter lever arrangement.

19. The combination according to claim 17, wherein said latching means comprises a generally L-shaped lever having a release member coupled to the extremity of one limb thereof by means of a resilient hinge portion, the extremity of the other limb of said L-shaped lever constituting an engaging member for engagement with a moving contact carrying member of said at least one pair of switching contacts for latching the same in contacts-open condition, the arrangement being such that, with said engaging member so latching said moving contact carrying member, a manual operation of said release member causes said L-shaped lever to pivot generally about the junction of its two limbs and with resilient flexing of its said hinge portion so as to release the latching of said moving contact carrying member.

20. The combination according to claim 19, including latching means associated with both of said first and second pairs of switching contacts and each comprising a said latching member, the two said latching members being combined into a single structure, where a single said release member couples with respective resilient hinge portions which in turn couple to respective said generally L-shaped levers.

21. The combination according to claim 15, wherein said first, second and third bimetallic elements each comprise snap-acting elements in the form of a dished bimetallic blade movable between oppositely curved configurations with a snap-action.

22. The combination according to claim 21, wherein the bimetallic blades of at least said first and second bimetallic elements have an arcuate cut-out therein defining a tongue released from the main body of said blade, relative movement occurring between the free end of said tongue and a part of the main body of said blade providing switch-operating movement of the respective pairs of switching contacts.

23. The combination according to claim 22, wherein the bimetallic blades of said first and second bimetallic elements are both mounted by their released tongue portions to a carrier which is secured in said first part of the element protector and steam sensing unit, said first bimetallic element being in direct intimate heat transfer relationship with said element head portion and said second bimetallic element being arranged to be subject to heat conducted from said element head portion by said carrier.

24. In combination with a water boiling vessel, an electric heating element and an element protector unit for switching off the power supply to said heating element in the event an element overheating caused by said element being powered when there is insufficient water in said vessel, said heating element comprising a resistance heating portion arranged for heating water in said vessel and an element head portion serving for mounting said heating element with respect to said vessel, said resistance heating portion of said element having cold tails projecting through said element head portion and including a return portion contacting said element head portion on one side thereof, and said element protector unit being assembled to said element head portion on the other side thereof from said resistance heating portion of said element and comprising primary and secondary safety cut-out switches connected in series with each other and said resistance heating portion of said element and serving for disconnecting said heating element from said electrical supply in the event of element overheating, said secondary cut-out switch having a higher operating temperature than said primary cut-out switch and serving as a back-up for said primary cut-out switch in the event of failure to operate of the same, each of said primary and secondary cut-out switches comprising a pair of switching contacts comprising a first contact engaged with a respective one of said cold tails of said resistance heating portion of said heating element and a second contact engaged with a respective one of a pair of power supply terminals provided in said element protector unit for the coupling of an electrical power supply thereto, one of said first and second contacts being mounted on a moving contact carrier which is coupled via an electrically-insulating movement-transferring member with a respective one of first and second snap-acting bimetallic members respectively constituting the prime movers of said primary and secondary cut-out switches, said first and second bimetallic members each being mounted in close heat transfer relationship with said other side of said element head portion, an electrically-insulating wall portion of said element protector unit being interposed between said first and second bimetallic members and said primary and secondary switching contact pairs and said electrically-insulating movement-transferring members extending through apertures defined in said wall portion.

25. The combination according to claim 24, wherein said element protector unit comprises a first body portion formed of electrically-insulating material, said power supply terminals being secured to said first body portion, and a second body portion formed of electrically-insulating material second with respect to said first body portion and defining a chamber therewith, said second body portion including said electrically-insulating wall portion, and said pairs of switching contacts of said primary and secondary cut-out switches being contained within said chamber.

26. The combination according to claim 24, wherein said movement-transferring member of one of said primary and secondary cut-out switches is arranged for coupling with a further thermal sensor associated with said vessel for operation of the respective electrical switch thereby when said element protector unit has associated therewith such a further sensor serving as a steam-sensitive switch-actuating element for operating the respective electrical switch via the respective said movement-transferring member when steam generated by water boiling in said vessel vents onto said further thermal sensor.

27. The combination according to claim 24, including a further thermal sensor located adjacent a steam vent in said vessel and coupled with at least one of said pairs of switching contacts for disconnecting the supply of power to said element when the water boils in said vessel.

28. The combination according to claim 27, including manually-releasable latching means associated with said moving contact carrier of at least that pair of switching contacts which is operable by said further thermal sensor.

29. The combination according to claim 28, wherein said manually releasable latching means comprises a lever coupling said further sensor with the respective moving contact carrier and an overcenter arrangement associated with said lever.

30. The combination according to claim 24, including manually-releasable latching means associated with said moving contact carrier of at least one of said pairs of switching contacts for latching the same in contacts-open condition until manually released.

31. The combination according to claim 30, wherein the said latching means comprises a generally L-shaped lever having a release member coupled to the extremity of one limb thereof by means of a resilient hinge portion, the extremity of the other limb of said L-shaped lever constituting an engaging member for engagement with the respective moving contact carrier for latching the same in contacts-open position, the arrangement being such that, with said engaging member so latching said moving contact carrier, a manual operation of said release member such as to cause said L-shaped lever to pivot generally about the junction of its two limbs with resilient flexing of its said hinge portion releases the latching of said moving contact carrier.

32. The combination according to claim 31, wherein such a latching means is associated with both said moving contact carriers.

33. The combination according to claim 32, wherein the release members of said two latching means are combined into a single member.

* * * * *